(12) United States Patent
Gandon-Pain et al.

(10) Patent No.: US 8,835,561 B2
(45) Date of Patent: Sep. 16, 2014

(54) RUBBER COMPOSITION CONTAINING BRANCHED BLOCKED POLYMERS

(75) Inventors: Sylvie Gandon-Pain, Clermont-Ferrand (FR); Alain Hut, Le Cendre (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 1239 days.

(21) Appl. No.: 11/989,917

(22) PCT Filed: Jul. 31, 2006

(86) PCT No.: PCT/FR2006/001852
§ 371 (c)(1),
(2), (4) Date: Feb. 1, 2008

(87) PCT Pub. No.: WO2007/014998
PCT Pub. Date: Feb. 8, 2007

(65) Prior Publication Data
US 2010/0154945 A1    Jun. 24, 2010

(30) Foreign Application Priority Data
Aug. 1, 2005    (FR) ...................................... 05 08207

(51) Int. Cl.
| | | |
|---|---|---|
| *C08L 77/00* | (2006.01) |
| *C08G 81/00* | (2006.01) |
| *C08G 81/02* | (2006.01) |
| *C08L 23/08* | (2006.01) |
| *C08L 53/02* | (2006.01) |
| *C08F 287/00* | (2006.01) |
| *C08L 51/00* | (2006.01) |
| *C08F 297/04* | (2006.01) |

(52) U.S. Cl.
CPC ............. *C08F 287/00* (2013.01); *C08L 51/006* (2013.01); *C08F 297/044* (2013.01); *C08L 53/02* (2013.01); *C08F 297/04* (2013.01); *C08F 297/046* (2013.01)
USPC .............................................. 525/98; 525/271

(58) Field of Classification Search
USPC .................................... 525/98, 271; 524/505
See application file for complete search history.

(56) References Cited

U.S. PATENT DOCUMENTS

| | | | |
|---|---|---|---|
| 4,996,266 A | 2/1991 | Bronn et al. | |
| 5,717,035 A | 2/1998 | Coolbaugh et al. | |
| 6,630,535 B1 * | 10/2003 | Hogan et al. ................... | 525/86 |
| 2005/0131159 A1 * | 6/2005 | Kim et al. ...................... | 525/242 |
| 2007/0135583 A1 * | 6/2007 | Lohse et al. ................ | 525/331.9 |

FOREIGN PATENT DOCUMENTS

| | | |
|---|---|---|
| EP | 0 709 235 | 5/1996 |
| EP | 1 018 521 | 7/2000 |
| EP | 1 380 604 | 1/2004 |
| FR | 2 854 635 | 11/2004 |
| FR | 2 854 636 | 11/2004 |
| WO | WO 02/16490 | 2/2002 |

* cited by examiner

*Primary Examiner* — Jeffrey Mullis
(74) *Attorney, Agent, or Firm* — Cozen O'Connor (57) ABSTRACT

Branched block polymers, and the rubber compositions containing them, which can be used, in particular, for manufacturing tires or semi-finished products for tires. Processes for preparing said polymers and compositions are also disclosed.

40 Claims, 1 Drawing Sheet

RUBBER COMPOSITION CONTAINING BRANCHED BLOCKED POLYMERS

RELATED APPLICATION

This is a U.S. National Phase Application under 35 USC 371 of International Application PCT/FR2006/001852, filed on Jul. 31, 2006.

This application claims the priority of French patent application no. 05/08207 filed Aug. 1, 2005.

The present invention relates to branched block polymers, to the rubber compositions containing them, which can be used, in particular, for manufacturing tires or semi-finished products for tires. It also relates to the processes for preparing said polymers and compositions.

BACKGROUND OF THE INVENTION

Improvement of the grip or comfort have become important priorities for a large number of tire ranges. Consequently, it is desirable to produce blends having good mechanical properties and an increased hysteresis in a certain temperature range in order to be able to use them for manufacturing semi-finished products that are incorporated in the composition of tire casings, such as for example underlayers, sidewalls or treads and to obtain tires that have an improved grip or comfort.

It is known that the degree of branching can influence certain properties of the polymers. Branched polymers can be prepared by radical, cationic, Ziegler-Natta, metallocene or anionic polymerization. Branched polymers can have various structures depending on the reaction conditions used.

Thus, it is known from the publications by Knauss et al., Polym. Prep. ACS. Div. Poly. Chem. 38(1), pages 68-69 (1997), Polym. Prep. ACS. Div. Poly, Poly Chem. 41(2) pages 1397-1398 (2000), J. Poly. Sci. Polym. Chem. 38, pages 4289-4298 (2000), J. Poly. Sci. Polym. Chem. 38, pages 3547-3555 (2001), Macromolécules, 35, pages 2055-2062 (2002), how to react a living anionic polymer, in this case polystyryllithium, with a coupling agent to form a macromonomer in situ which in turn reacts with the living chains present. The living chains thus formed react with the newly introduced coupling agent and this continues until the coupling agent is completely consumed. The reaction with a difunctional or tetrafunctional electrophilic agent leads to highly branched "pom-pom" or "pom-star" polymers, the arms of which may themselves be branched or connected to linear-dendritic hybrids when the coupling agent is added slowly.

Document U.S. Pat. No. 4,996,266 discloses the synthesis of branched copolymers, the arms (or grafts) of which are arranged along the main chain, either randomly or at predetermined locations.

These copolymers are obtained by the synthesis of a living elastomer obtained by reaction of a lithium initiator with a polymerizable monomer and a so-called organometallic condensing agent bearing a vinyl functional group; the lithium initiator is used at a sub-stoichiometric molar ratio relative to the condensing agent, then reaction with a multifunctional coupling agent.

These branched copolymers, that can be used as adhesives, have a structure which approaches a random and dendritic structure since there is simultaneously formation of the macromonomer and polymerization of the polymerizable monomer.

Document WO 02/16490 A2 describes a branched polymer having a comb structure with a large number of side arms that confer damping properties. This document also describes the use of this comb-structured branched polymer in tire treads.

SUMMARY OF THE INVENTION

The present inventors have discovered during their research that a specific rubber composition, based on a branched diene polymer having a specific structure makes it possible to obtain a significant increase of the hysteresis in a certain temperature range relative to the usual black blends. The tire treads and tires obtained from these rubber compositions have improved grip and comfort properties.

Consequently, a first subject of the invention relates to a branched diene polymer which corresponds to a block elastomer comprising at least two main linear diene polymer chains (known as branches), and preferably having 2 branches, joined together by a group having a heteroatom, such as, in particular, silicon, germanium, tin, lead, phosphorus, or by a radical derived from any at least difunctional, non-polymerizable, electrophilic coupling agent such as an ester, multiester, orthoester, diisocyanate, etc. and having at each of the other ends at least two linear diene polymer chains (also known as grafts).

Another subject of the invention relates to a branched linear diene polymer that corresponds to a block elastomer comprising at least two linear diene polymer chains (grafts) all placed at one of the ends of a main linear diene polymer chain, knowing that the other end bears a functional group, advantageously a functional group of carboxylic acid, alcohol, amine, silanol, alkoxysilane or organostannyl type, or a proton.

The end terminated by a proton is obtained by deactivation of the propagating main polymer chain by addition of an acidic proton donor, such as for example methanol.

Another subject of the invention is a process for preparing such elastomers.

Another subject of the invention relates to a rubber composition, that can be used for manufacturing tires, based on at least: an elastomer according to the invention and a reinforcing filler Another subject of the invention is the use of a composition according to the invention for manufacturing finished articles or semi-finished products comprising a rubber composition according to the invention, these articles or products being intended for any ground-contact system for motor vehicles, such as tires, internal safety supports for tires, wheels, rubber springs, elastomeric joints, other suspension and anti-vibratory elements.

Another subject of the invention is the use of a composition according to an embodiment of the invention for manufacturing tires or semi-finished products made of rubber intended for these tires, these semi-finished articles being especially chosen from the group composed of treads, underlayers intended, for example, to be placed under these treads, crown reinforcement plies, sidewalls, casing reinforcement plies, beads and protectors. Another subject of the invention is these finished articles and semi-finished products themselves, in particular the tires and semi-finished products for tires, when they have an elastomeric composition according to an embodiment of the invention. The tires according to an embodiment of the invention may especially be intended for passenger vehicles such as industrial vehicles chosen from vans, "heavy goods vehicles" i.e. subway trains, buses, heavy road transport vehicles (lorries, tractors, trailers) and off-road vehicles, agricultural or civil engineering vehicles, planes, and other transport or handling vehicles.

DETAILED DESCRIPTION

I. Conditions for Implementation of the Invention

In the present description, except where expressly indicated otherwise, all the percentages (%) indicated are weight %.

I-1. Elastomers

One of the subjects of the invention therefore relates to block elastomers comprising at least two main linear diene polymer chains, and preferably those comprising only two main linear polymer chains, the main linear polymer chains being joined together (at one of their ends) by a group having a heteroatom derived from a coupling agent, such as, in particular, silicon, germanium, tin, lead, phosphorus or by a radical derived from any at least difunctional electrophilic coupling agent, such as, for example ester, multiester, orthoester, diisocyanate, etc. radical and having at each of the other ends at least two linear diene polymer chains.

According to one preferred implementation method of the invention, the block elastomers according to the invention have 2 branches which may be represented in the following manner:

Grafts

Thus, according to this representation, the main chain (represented horizontally) is called the core of the elastomer and is a linear diene polymer and the ends of the chains, distributed, on average, in equal numbers on both sides of the core, are called grafts and are linear diene polymers.

This representation is of course an average representation as the branched diene polymer may be asymmetrical.

In this diagram, the grafts are an average number of 10 (2×5), but their number may vary depending on the conditions used during the process for preparing said elastomers, and especially depending on the number of branches which form the core of the elastomer.

Thus, according to one particular aspect of the invention, the block elastomer comprises, on average, from 2 to 25, advantageously from 3 to 10, linear diene polymer chains placed at one of the ends of each main diene polymer chain or branch, namely for 2 branches, up to 2×25 grafts.

Another subject of the invention relates to block elastomers comprising a main linear diene polymer chain and at least two grafts, that is to say at least two linear diene polymer chains all placed at one of the ends of said main linear diene polymer chain, the other end bearing either a proton, or a Z functional group of electrophilic type, advantageously of the carboxylic acid, alcohol, amine, silanol, alkoxysilane, organostannyl, etc. type.

According to one preferred implementation method of the invention, the block elastomers thus defined according to the invention comprise a Z functional group and 5 grafts which may be represented in the following manner:

The block elastomers then comprise, on average, from 2 to 25, advantageously from 3 to 10, linear diene polymer chains (grafts) all placed at one of the ends of each main linear diene polymer chain.

The main polymer chains and the polymer chains of the grafts comprise linear diene polymers.

The linear diene polymers of the grafts are generally homopolymers or copolymers of diene monomers (monomers bearing two conjugated or unconjugated carbon-carbon double bonds).

The expression "mainly unsaturated" diene polymer is understood here to mean a diene polymer derived at least partly from conjugated diene monomers having a content of units of diene origin (conjugated dienes) which is greater than 15% (mol %). It is in this way, for example, that diene polymers such as butyl rubbers or EPDM-type copolymers of dienes and α-olefins do not come under this definition and may be qualified, on the other hand, as "mainly saturated" diene polymers (low or very low content of units of diene origin, always less than 15%). In the category of "mainly unsaturated" diene polymers, in particular the expression "highly unsaturated" diene polymer is understood to mean a diene polymer having a content of units of diene origin (conjugated dienes) which is greater than 50%.

Given these general definitions, the linear diene polymers of the grafts and of the core of the elastomer are preferably mainly unsaturated, in particular with:

(a) any homopolymer obtained by polymerization of a conjugated diene monomer having from 4 to 12 carbon atoms; and (b) any copolymer obtained by copolymerization of one or more conjugated dienes together or with one or more vinyl aromatic compounds having from 8 to 20 carbon atoms.

As conjugated dienes, 1,3-butadiene, 2-methyl-1,3-butadiene, 2,3-di(C1-C5 alkyl)-1,3-butadienes such as, for example, 2,3-dimethyl-1,3-butadiene, 2,3-diethyl-1,3-butadiene, 2-methyl-3-ethyl-1,3-butadiene, 2-methyl-3 isopropyl-1,3-butadiene, an aryl-1,3-butadiene, 1,3-pentadiene, and 2,4-hexadiene are especially suitable. As vinyl aromatic compounds, styrene, ortho-, meta-, para-methylstyrene, the commercial "vinyltoluene" mixture, para-tert-butylstyrene, methoxystyrenes, chlorostyrenes vinylmesitylene and vinylnaphthalene are, for example, suitable.

The copolymers may contain between 99% and 20% by weight of diene units and between 1% and 80% by weight of vinyl aromatic units. The copolymers may have any microstructure which is a function of the polymerization conditions used, especially of the presence or absence of a modifying and/or randomizing agent and of the amounts of modifying and/or randomizing agent used. The polymers may be, for example, non-linear block, random, linear block or microblock polymers and may be prepared in dispersion or in solution. They may optionally be coupled or functionalized with a coupling or functionalizing agent.

Preferably, the following are suitable: polybutadienes, and in particular those having a content of 1,2-units between 4% and 80%, polyisoprenes, butadiene/styrene copolymers and in particular those having a styrene content between 5% and 50% by weight and more particularly between 20% and 40%, a content of 1,2-bonds of the butadiene part between 4% and 70%, a content of trans-1,4 bonds between 20% and 80%, butadiene/isoprene copolymers and especially those having an isoprene content between 5% and 90% by weight, isoprene/styrene copolymers and especially those having a styrene content between 5% and 50% by weight. In the case of butadiene/styrene/isoprene copolymers the following are suitable: in particular those having a styrene content between 5% and 50% by weight and more particularly between 10% and 40%, an isoprene content between 15% and 60% by weight and more particularly between 20% and 50%, a butadiene content between 5% and 50% by weight and more particularly between 20% and 40%, a content of 1,2-units of the butadiene part between 4% and 85%, a content of trans-1,4 units of the butadiene part between 6% and 80%, a content of 1,2-units plus 3,4-units of the isoprene part between 5% and 70% and a content of trans-1,4 units of the isoprene part between 10% and 50%, and more generally any butadiene/styrene/isoprene copolymer having a Tg between 0° C. and −70° C.

In summary, particularly preferably, the diene polymers of the grafts of the elastomer according to the invention are chosen from the group of mainly, or even highly, unsaturated linear diene elastomers made up of polybutadienes (BRs), synthetic polyisoprenes (IRs), butadiene copolymers, isoprene copolymers and blends of these polymers.

Such copolymers are more preferably chosen from the group made up of butadiene/styrene copolymers (SBRs), isoprene/butadiene copolymers (BIRs), isoprene/styrene copolymers (SIRs), isoprene/butadiene/styrene copolymers (SBIRs) and blends of such copolymers.

Each main polymer chain also comprises linear diene polymers. Thus, the diene polymers present in a main chain may be defined in the same way as those present in the grafts. They may be of a chemical nature that is different from or identical to those present in the grafts. Advantageously, the diene polymers of a main chain are highly unsaturated (such as defined above). They are, in particular, chosen from polybutadienes (BRs), synthetic polyisoprenes (IRs), butadiene copolymers, isoprene copolymers and blends of these polymers.

When the core of the block elastomer is composed of 2 or more branches, each main linear polymer chain is joined to another branch by a group having a heteroatom, such as, in particular, silicon, germanium, tin, lead, phosphorus or by a radical derived from an electrophilic coupling agent such as, in particular, an ester, multiester, orthoester or diisocyanate. The core of the elastomer may comprise several branches depending on the nature of the electrophilic coupling agent, advantageously from 2 to 6 branches.

The group having a heteroatom may vary depending on the conditions of implementation of the process for preparing the elastomer according to the invention. Advantageously, the heteroatom is silicon. The organosilicon group may be of the following formula (I): $Si(R_1)_{4-n}$, in which n is an integer 2, 3 or 4 (advantageously 2), $R_1$, being identical or different, is a $C_1$-$C_{12}$ hydrocarbon-based radical, preferably a saturated, linear, cyclic or branched, $C_1$-$C_6$ alkyl radical, advantageously a methyl or ethyl radical, a $C_5$-$C_{18}$ cycloalkyl radical, a $C_6$-$C_{18}$ aryl radical, in particular a phenyl, $C_1$-$C_{12}$ alkoxyl, $C_5$-$C_{18}$ cycloalkoxyl or $C_6$-$C_{18}$ aryloxy radical. The organosilicon group may also be of the following formula (II): $(R_1)_{3-n'}Si$—$R'$—$Si(R_1)_{3-m}$, in which R' is a linear or cyclic $C_1$-$C_{12}$, preferably $C_1$-$C_6$ alkylene radical, advantageously a methylene radical, a $C_5$-$C_{18}$ cycloalkylene radical, a $C_6$-$C_{18}$ arylene radical, in particular a phenylene radical, n' and m, being identical or different, represent an integer 1, 2 or 3 and $R_1$ corresponds to the meaning given above.

In the case of a functionalized branched elastomer, the functionalizing agents may be any known functionalizing agents that are conventionally used in anionic polymerization and advantageously 4,4'-bis(diethylamino)benzophenone, ethylene oxide, hexamethylcyclotrisiloxane, $CO_2$, alkoxysilanes or tributyltin chloride.

The length of a main linear polymer chain is advantageously greater than the length of a graft. According to one preferred mode, the length of each graft may be from 1000 to 4 times, advantageously from 100 to 10 times, smaller than that or any of the branches that make up the main chains.

The length of each main linear chain is described in terms of average length. The average length refers to the number-average molecular weight of the chains, before they are joined together to form the elastomer according to the invention. Except where indicated otherwise, the number-average molecular weights are given by the equation $M_n$=charge of monomer by weight×conversion/theoretical number of moles of active alkali metal, knowing that the theoretical number of moles of active alkali metal is equal to the total number of moles of alkali metal introduced minus the number of moles of alkali metal used to neutralize the impurities.

The length of each main branch or chain may vary to a large extent. To give an order of magnitude, each linear polymeric part of each branch preferably has a number-average molecular weight between 2000 and 500 000, advantageously between 50 000 and 300 000 (according to the diagram above, the main chain therefore has two polymeric parts). The length of each linear chain of the grafts present at the ends of the main chain preferably has a number-average molecular weight between 500 and 70 000, advantageously between 2500 and 25 000.

I-2. Preparation of the Elastomers

The elastomers according to the invention are advantageously obtained by the process described below.

Thus, another subject of the present invention is a process for preparing elastomers according to the invention, which comprises at least the following steps:

(1) synthesis of a macromonomer by reaction of at least one living linear diene polymer having a carbanion with a stoichiometric excess relative to the theoretical amount of active alkali or alkaline-earth metal of a compound having a group polymerizable by an anionic route and a group capable of nucleophilic displacement via the carbanion of said living polymer;

(2) reaction of the macromonomer solution formed in step (1) with a nucleophilic initiator, to obtain a living polymacromonomer;

(3) reaction of the living polymacromonomer obtained in step (2) with at least one conjugated diene monomer having from 4 to 12 carbon atoms, such as butadiene, in order to obtain a living polymacromonomer/linear diene polymer diblock; and (4) reaction of the living diblock obtained in step (3) either with an at least difunctional, non-polymerizable, electrophilic coupling reactant, or with an electrophilic reactant that is a precursor of functional groups, such as, in particular, alcohol, carboxylic acid, amine, silanol, alkoxysilane or organostannyl groups, or with an acidic proton donor compound.

The living polymer used in step (1) is a polymer of diene nature which will correspond to a graft such as defined above. Thus, it may especially be chosen from polybutadienes (BRs), synthetic polyisoprenes (IRs), butadiene copolymers, isoprene copolymers, butadiene/styrene copolymers (SBRs), isoprene/butadiene copolymers (BIRs), isoprene/styrene copolymers (SIRs), isoprene/butadiene/styrene copolymers (SBIRs) and blends of such (co)polymers.

This polymer has a carbanion at one of its ends, and its counterion is derived from the family of alkali or alkaline-earth metals, in particular from lithium.

The processes for preparing polymers used in step (1) are widely described in the literature (see "Principles of Polymerization" 3rd edition, G. Odian, John Wiley & Sons, 1991) and are therefore within the reach of a person skilled in the art.

The compound having both a group polymerizable by an anionic route and a group capable of nucleophilic displacement via the carbanion of said living polymer is preferably a compound having a styryl functional group on the one hand and a halogen atom on the other hand, such as, in particular, chlorine, bromine, iodine and fluorine. Mention may be made, for example, of chloromethylstyrene (VBC), chlorodimethylsilylstyrene, chlorodimethylsilylmethylstyrene or bromomethylstyrene. These products are commercially available or can be synthesized by processes described in the literature (cf. Asami et al., Polym. Prepr. ACS, Div. Polym. Chem. 29(2), 19-20 (1998)).

The compound having both a group polymerizable by an anionic route and a group capable of nucleophilic displacement via the carbanion of said living polymer is used in stoichiometric excess relative to the theoretical amount of active alkali or alkaline-earth metal, advantageously of active Li, that is to say in an amount strictly greater than 1.0 and less than 2 molar equivalents, preferably from 1.05 to 1.5 molar equivalents, in order to obtain a linear structure of the macromonomer.

The reaction temperature of step (1) is generally between −20° C. and 70° C.; it is typically from −10° C. to 5° C. to moderate the reactivity of the carbanion and to orientate the reaction towards nucleophilic displacement. The temperature is a known means for moderating the reactivity, but any other means known to a person skilled in the art may be used, such as the prior reaction of the living chain end with diphenylethylene.

Step (1) may be carried out in a polar or non-polar solvent, such as tetrahydrofuran (THF), or a hydrocarbon-based compound, such as acyclic or cyclic hexanes and heptanes, octanes, pentanes and their alkylated derivatives (for example methylcyclohexane), or else an aromatic solvent (for example toluene) or mixtures thereof and/or in the presence of ether, amine or randomizing coordinators such as sodium alcoholates for the synthesis of a diene macromonomer (including SBR) having a content of 1,2-units greater than 10%.

In the case of the synthesis of a macromonomer with a content of 1,2-units greater than 10% (including SBR) by means known to a person skilled in the art, it is advantageous to further reduce the reactivity of the carbanion, which is exacerbated by the presence of polar compounds, to minimize the parasitic reaction which is the nucleophilic addition reaction over the styryl double bond and therefore to maintain a sufficient reaction selectivity. The means for achieving this are, in particular, the introduction of the adduct of formula LiAl(R)3(R'), described in U.S. Pat. No. 6,506,862 B2, where R and R' each independently represent an alkyl, cycloalkyl or aryl group, or else the introduction of diphenylethylene before reaction with the compound having both a group polymerizable by an anionic route and a group capable of nucleophilic displacement via the Thus, in the case of a reaction in step (1) of polybutadiene with VBC, the product (also known as macromonomer) which may be obtained at the end of step (1) corresponds to a styrene substituted by a linear polybutadiene polymer chain.

The nucleophilic initiator used in step (2) may be any initiator commonly used in anionic polymerization reactions. It may be, in particular, an initiator of general formula (III): R-M, in which M represents a metal chosen from an alkali metal and an alkaline-earth metal and R represents a linear or branched alkyl radical containing from 2 to 6 carbon atoms or an aryl radical having 6 to 12 carbon atoms.

Nucleophilic initiators may especially be chosen from sec-butyllithium, n-butyllithium, t-butyllithium, sodium naphthalene, 1,4-disodio-1,1,4,4-tetraphenylbutane, diphenylmethylpotassium, diphenylmethylsodium, 1'-methylstyryllithium and 1,1-diphenyl-3-methylpentyl-lithium or else functional initiators, such as those bearing an optionally protected amine, tin, imine or alcohol functional group. Preferably, the initiator is sec-butyllithium.

Anionic polymerization is generally carried out in a polar or non-polar solvent, such as tetrahydrofuran (THF), or a hydrocarbon-based compound such as acyclic or cyclic hexanes and heptanes, octanes, pentanes and their alkylated derivatives (e.g. methylcyclohexane), or an aromatic solvent or mixtures thereof. When the macromonomer formed in step (1) or when the core of the branched elastomer is a copolymer of a conjugated diene and a vinyl aromatic compound, in order to promote the random character of the copolymerization and/or to control the content of vinyl species, a polar coordinator (or modifying and/or randomizing agent) may be added to the reaction mixture. The amount of polar coordinator used may vary from 0 to around 90 or more equivalents per molar equivalent of lithium. The amount of polar coordinator depends on the desired amount of vinyl, on the styrene content used, on the polymerization temperature, and also on the nature of the coordinator used. Such coordinators include, for example, ethers or amines that provide the envisaged microstructure.

The reaction of the macromonomer solution formed in step (1) with the nucleophilic initiator for polymerizing the macromonomer is advantageously carried out in a medium with relatively high minimum polarity in order to obtain a narrow polydispersity index PI of the elastomer according to the invention. The polarity of the medium is controlled in a manner known per se as a function of the polar agent used.

Another subject of the invention is the diene polymacromonomer capable of being obtained by reaction of the living polymacromonomer, obtained at the end of step 2, either with an electrophilic reactant that is a precursor of functional groups, such as, in particular, alcohol, carboxylic acid, amine, silanol, alkoxysilane or organostannyl groups, or with an acidic proton donor compound.

Thus, another subject of the present invention is a process for preparing diene polymacromonomers comprising steps (1) and (2) such as defined above, preferably followed by the reaction of the living polymacromonomer, obtained at the end of step 2, either with an electrophilic reactant that is a precursor of functional groups, such as, in particular, alcohol, carboxylic acid, amine, silanol, alkoxysilane or organostannyl groups, or with an acidic proton donor compound. The conditions and acidic proton donor compounds and electrophilic reactants that are precursors of functional groups capable of being used for this step are such as described hereinbelow.

Step (3) such as identified above corresponds, in particular, to a diene polymerization by propagation of dienes from the living polymacromonomer from step (2). Thus, the conditions of this step correspond more specifically to the conventional conditions used during an anionic polymerization. This step makes it possible, in particular, to prepare the polymeric part of the main linear chain of the elastomer according to the invention.

In particular, the conjugated dienes used are especially 1,3-butadiene, 2-methyl-1,3-butadiene, 2,3-di($C_1$ to $C_5$ alkyl)-1,3-butadienes such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene, and 2,4-hexadiene.

The addition of vinyl aromatic compounds may also be envisaged in order to form a copolymer type chain. Thus, as vinyl aromatic compounds, styrene, ortho-, meta-, para-methylstyrene, the commercial "vinyltoluene" mixture, para-tert-butylstyrene, methoxystyrenes, chlorostyrenes, vinylmesitylene and vinylnaphthalene are, for example, suitable.

The compound thus obtained in step (3) may be brought together with an at least difunctional, non-polymerizable, electrophilic coupling agent according to step (4). As electrophilic coupling agents, the following are suitable: advantageously halogenated or non-halogenated organometallic compounds corresponding to the following formulae (IV): $Y(X)_n(R_1)_{4-n}$, or (V): $(R_1)_{3-n}X_mY-R'-YX_n(R_1)_{3-n'}$, in which n is an integer 2, 3 or 4 (advantageously 2) or n' and m, being identical or different, represent an integer 1, 2 or 3, Y is Si, Ge, Sn, Pb, X is a halogen atom, such as especially chlorine, bromine, iodine and fluorine, advantageously chlorine, or an alkoxyl or aryloxy group, $R_1$, being identical or different, is a $C_1$-$C_{12}$ hydrocarbon-based radical, preferably a saturated, linear, cyclic or branched $C_1$-$C_6$ alkyl radical, advantageously a methyl or ethyl radical or a $C_6$-$C_{18}$ aryl radical, advantageously a phenyl group, R' being a linear or cyclic $C_1$-$C_{12}$ unsaturated hydrocarbon-based radical, preferably a $C_1$-$C_6$ alkylene radical and advantageously a methylene radical, or a $C_6$-$C_{18}$ arylene radical and advantageously a phenylene radical. The following may also be suitable: phosphites, advantageously compounds corresponding to the formulae $P(OR_1)_3$ or $P(OAr)_3$ in which $R_1$ corresponds to the definition above and Ar is a $C_6$-$C_{18}$ aryl radical; and tin derivatives corresponding to the following general formula (VI): $(R_1)_{4-n}Sn(X)_n$ in which $R_1$, X and n have the meaning indicated above; esters; orthoesters; multiesters; or diisocyanates.

Preferably, the coupling agent is a silicon compound corresponding to the formula $Si(X)_n(R_1)_4$, in which X, $R_1$ and n correspond to the definition above.

The amount of at least difunctional, non-polymerizable, electrophilic coupling agent may vary depending on its functionality and depending on the desired number of branches. Practically, it is advantageously between 0.1 and 0.5 molar equivalents relative to the compound obtained in step (3).

According to one implementation variant of the process of the invention, the compound thus obtained in step (3) may be brought together with an acidic proton donor, according to step (4), and advantageously methanol, or else a functionalizing agent (or electrophilic reactant) in an amount of 1 to 10, preferably from 1 to 3, molar equivalents. As functionalizing agents, advantageously agents that are precursors of carboxylic acid, alcohol, silanol, alkoxysilane, organostannyl or amine functional groups are suitable.

In a manner known per se, the process advantageously comprises, in addition, a step (5) that brings the polymer obtained at the end of step (4) into contact with an antioxidant or a proton donor agent, especially an alcohol and preferably methanol. This agent reduces, or even prevents, in particular any oxidation or crosslinking of the branched block polymer of the invention. The agent may be any antioxidant conventionally used in the field of polymers; in particular mention may be made of 2,2'-methylenebis(4-methyl-6-tert-butylphenol) and N-1,3-dimethylbutyl-N-phenylparaphenylenediamine. The amount of this agent may vary to a large extent; it is generally between 0.1 and 5 per hundred parts of elastomer relative to the compound obtained in step (4).

The temperature of steps (2), (3) and (4) may generally be between around 0° C. and 90° C., preferably between around 20° C. and 70° C.

All the reactors, monomers, solvents and other compounds are first advantageously sparged with nitrogen. Except where indicated otherwise, the solutions are prepared in methylcyclohexane. The solution of nBuLi is advantageously in cyclohexane.

The set of steps described above may be carried out in batch mode or advantageously continuously, in particular without isolating (nor purifying) the reaction products obtained after each step, except when it is desired to recover the polymacromonomer at the end of step 2.

The block copolymer thus prepared is recovered according to conventional methods, especially by drying at high temperature and/or under reduced pressure or by stripping.

A person skilled in the art may of course choose the suitable reaction conditions to carry out the process according to the invention.

I-3. Rubber Composition

The invention also relates to a rubber composition, that can be used for the manufacture of tires, based on at least: one branched block elastomer according to the invention and a reinforcing filler.

Of course, the expression composition "based on" should be understood to mean a composition comprising the in situ mixture and/or reaction product of the various constituents used, some of these base constituents being able to, or intended to react together, at least partly, during the various phases of manufacturing the composition, in particular during its crosslinking.

The composition according to the invention can, for example, be used as a tread for a tire, this tire being either new or worn (in the case of retreading).

The composition according to the invention can, for example, be used as a tread for passenger vehicle or heavy goods vehicle tires, or used as a mixture inside a tire, for example for producing underlayers, or for calendering crown or casing reinforcements.

According to another advantageous embodiment of the invention, especially when it is intended for a tire sidewall, the composition according to the invention may contain at least one mainly saturated diene elastomer, in particular at least one EPDM copolymer, as a blend with one or more elastomers according to the invention.

The compositions of the invention may contain a single elastomer according to the invention or a blend of several elastomers according to the invention, the diene elastomer or elastomers possibly being used in combination with any type of synthetic elastomer other than a diene elastomer, or even with polymers other than elastomers, for example thermoplastic polymers.

It is possible to use any type of known reinforcing filler for its abilities to reinforce a rubber composition that can be used for manufacturing tires, for example an organic filler such as carbon black or else a reinforcing inorganic filler such as silica with which a coupling agent will be combined.

As carbon blacks, the following are suitable: all carbon blacks, especially blacks of the HAF (High Abrasion Furnace), ISAF (Intermediate Super Abrasion Furnace), SAF (Super Abrasion Furnace) type, conventionally used in tires (known as tire-grade blacks), for example in treads for these tires. Among the latter, mention may more particularly be made of reinforcing carbon blacks of the 100, 200 or 300 series (ASTM grades) such as, for example, the blacks N115, N134, N234, N330, N339, N347, N375.

As reinforcing inorganic fillers, the following are especially suitable: mineral fillers of the siliceous type, in particular silica (SiO$_2$), or of the aluminous type, in particular alumina (Al$_2$O$_3$) or aluminium (oxy)hydroxides. The silica used may be any reinforcing silica known to a person skilled in the art, especially any precipitated or fumed silica having a BET surface area and also a CTAB specific surface area that are both less than 450 m$^2$/g, preferably from 30 to 400 m$^2$/g. Highly dispersible precipitated silicas (known as HD precipitated silicas) are preferred, in particular when the invention is used for manufacturing tires that have a low rolling resistance; as examples of HD silicas, mention may be made of ULTRASIL 7000 and ULTRASIL 7005 silicas from Degussa, ZEOSIL 1165 MP, 1135 MP and 1115 MP silicas from Rhodia, HI-SIL EZ150G silica from PPG, ZEOPOL 8715, 8745 and 8755 silicas from Huber. As examples of reinforcing aluminas, mention may be made of the aluminas BAIKALOX A125 or CR125 (by Beïkowski), APA-100RDX (by Condea), ALUMINOXID C (by Degussa) or AKP-G015 (Sumitomo Chemicals).

In order to couple the reinforcing inorganic filler to the diene elastomer, any known coupling or bonding agent is used, in particular at least difunctional polyorganosiloxanes or organosilanes. In particular, polysulphide silanes will be used, that are known as "symmetrical" or "asymmetrical" depending on their particular structure, such as described, for example, in Patents or Patent Applications FR 2 149 339, FR 2 206 330, U.S. Pat. No. 3,842,111, U.S. Pat. No. 3,873,489, U.S. Pat. No. 3,978,103, U.S. Pat. No. 3,997,581, U.S. Pat. No. 4,002,594, U.S. Pat. No. 4,072,701, U.S. Pat. No. 4,129, 585, U.S. Pat. No. 5,580,919, U.S. Pat. No. 5,583,245, U.S. Pat. No. 5,650,457, U.S. Pat. No. 5,663,358, U.S. Pat. No. 5,663,395, U.S. Pat. No. 5,663,396, U.S. Pat. No. 5,674,932, U.S. Pat. No. 5,675,014, U.S. Pat. No. 5,684,171, U.S. Pat. No. 5,684,172, U.S. Pat. No. 5,696,197, U.S. Pat. No. 5,708, 053, U.S. Pat. No. 5,892,085, EP 1 043 357, WO 01/49782, WO 02/22728, WO 02/31041, WO 02/083782.

Preferably, the total content of reinforcing filler (carbon black and/or reinforcing inorganic filler) is between 20 and 200 phr, more preferably between 30 and 150 phr (parts by weight per hundred parts of elastomer), the optimum being different depending on the targeted applications: the level of reinforcement expected in a bicycle tire for example is, in a known manner, substantially lower than that required for a tire capable of rolling at high speed in a sustained manner, for example a motorcycle tire, a tire for a passenger vehicle or for a utility vehicle such as a heavy goods vehicle.

In the light of the present description, a person skilled in the art will be sure to adjust this content, in the domains indicated above, as a function of the targeted application, for example the part of the tire for which the rubber composition of the invention is intended, of the nature of the diene elastomer or else of the amount of reinforcing filler used.

The composition of the invention may additionally comprise a vulcanization system, in particular sulphur, other customary sulphur-donor agent(s) or the mixture thereof.

Of course, the rubber compositions according to the invention also comprise all or some of the additives normally used in rubber compositions having a diene elastomer and intended for manufacturing tires or semi-finished products for tires, such as for example plasticizers, protective agents such as anti-ozone waxes, chemical antiozonants, antioxidants, anti-fatigue agents, adhesion promoters, reinforcing resins such as described, for example, in WO 02/10269, peroxides and/or bismalimides, various known vulcanization activators or secondary accelerators such as zinc oxide, stearic acid, guanidine derivatives (in particular diphenylguanidine), etc. Combined with the reinforcing filler, especially when it is a reinforcing inorganic filler, may also be, if necessary, a conventional inorganic filler that is not very or not at all reinforcing, for example particles of clays, bentonite, talc, chalk or kaolin.

In the case where the reinforcing filler used is an inorganic filler, it will be possible to advantageously use agents for covering the reinforcing inorganic filler, or more generally processing aids capable, in a known manner, due to an improvement in the dispersion of the inorganic filler in the rubber matrix and a lowering in the viscosity of the compositions, of improving their processability in the uncured state, these agents being, for example, alkylalkoxysilanes, especially alkyltriethoxysilanes, such as for example 1-octyl-triethoxysilane sold by Degussa-Hüls under the name DYNASYLAN OCTEO or 1-hexa-decyltriethoxysilane sold by Degussa-Hüls under the name Si216, polyols, polyethers (for example polyethylene glycols), primary, secondary or tertiary amines (for example trialkanolamines), hydroxylated or hydrolysable polyorganosiloxanes, for example α,ω-dihydroxypolyorganosiloxanes (especially α,ω-dihydroxypolydimethylsiloxanes).

I-4. Preparation of the Rubber Compositions

The compositions are manufactured in suitable mixers, using two successive preparation phases well known to a person skilled in the art: a first phase of thermomechanical working or kneading (sometimes referred to as a "non-productive" phase) at high temperature, up to a maximum temperature (denoted by T$_{max}$) between 110° C. and 190° C., preferably between 130° C. and 180° C., followed by a second phase of mechanical working (sometimes referred to as a "productive" phase) at a lower temperature, typically below 110° C., for example between 40° C. and 100° C., a finishing phase during which the crosslinking or vulcanization system is incorporated. Such phases have been described, for example, in Applications EP-A-0501227, EP-A-0735088, EP-A-0810258, EP-A-0881252, WO99/28376, WO00/05300, WO00/05301 or WO02/10269.

The process for manufacturing compositions according to the invention comprises the following steps:
  incorporating into a diene elastomer, during a first so-called "non-productive" step, at least one reinforcing filler, by thermomechanically kneading the whole mixture, in one or more goes, until a maximum temperature between 110° C. and 190° C. is reached;
  cooling the assembly to a temperature below 100° C.;
  then incorporating, during a second so-called "productive" step, the crosslinking or vulcanization system;
  kneading the whole assembly up to a maximum temperature that is below 120° C.; and
  extruding or calendering the rubber composition thus obtained, in the desired form, such as a tire tread for example.

By way of example, the first (non-productive) phase is carried out in a single thermomechanical step during which all the necessary base constituents, the optional additional covering agents or processing aids and various other additives, apart from the vulcanization system, are introduced into a suitable mixer, such as a standard internal mixer. A second step of thermomechanical work may be added to this internal mixer, after dropping the mixture and intermediate cooling (cooling temperature preferably below 100° C.) for the purpose of subjecting the compositions to an additional thermomechanical treatment, especially to further improve the dispersion, in the elastomeric matrix, of the reinforcing filler and other ingredients. The total kneading time, in this non-productive phase, is preferably between 2 and 10 minutes.

After cooling the mixture thus obtained, then the vulcanization system is incorporated at low temperature, generally in an external mixer such as an open mill; the whole assembly is then mixed (productive phase) for a few minutes, for example between 5 and 15 minutes.

The final composition thus obtained is then calendered, for example in the form of a sheet or else extruded, for example to form a rubber profile used for manufacturing semi-finished products such as treads, crown plies, sidewalls, casing plies, beads or protectors.

The vulcanization (or curing) is carried out in a known manner at a temperature generally between 130° C. and 200° C. for a sufficient time which may vary, for example, between 5 and 90 min depending, in particular, on the curing temperature, the vulcanization system used, the vulcanization kinetics of the composition in question or, for example, on the size of the tire.

The vulcanization system itself is preferably based on sulphur and on a primary vulcanization accelerator, in particular a sulphenamide-type accelerator. Added to this vulcanization system, incorporated during the first non-productive phase and/or during the productive phase, are various known vulcanization activators or secondary accelerators such as zinc oxide, stearic acid, guanidine derivatives (in particular diphenylguanidine), etc. The sulphur content is preferably between 0.5 and 3.0 phr, and the content of the primary accelerator is preferably between 0.5 and 5.0 phr.

It goes without saying that the invention relates to the rubber compositions previously described both in the so-called "uncured" (i.e. before curing) and in the so-called "cured" or vulcanized state (i.e. after crosslinking or vulcanization).

The compositions according to the invention may be used alone or as a blend (i.e. as a mixture) with any other rubber composition that can be used, for example, for manufacturing tires.

The invention is illustrated in the following section by examples and FIG. 1 which should be considered as illustrative and non-limiting.

line-earth metal introduced minus the number of moles of alkali or alkaline-earth metal used to neutralize the impurities.

II-B—Determination of the Molecular Weight Distribution of the Polymers Obtained by the Size Exclusion Chromatography (Sec) Technique:

Polymer Preparation:

There is no particular treatment of the polymer sample before analysis. It is simply dissolved in tetrahydrofuran to a concentration of around 1 g/l.

Measurement Principle:

The polymer chains are separated according to the size that they occupy when they are dissolved in tetrahydrofuran: the more they occupy a large volume, the less the pores of the columns are accessible to them and the shorter their elution time is.

Without being an absolute method, SEC allows the molecular weight distribution of a polymer to be assessed. From standards, the various number-average ($M_n$) and weight-average ($M_w$) molecular weights may be determined and the polydispersity index calculated ($PI=M_w/M_n$).

The polymer is dissolved in tetrahydrofuran to a concentration of 1 g/l. A volume of 100 µl is injected through a set of size exclusion chromatography columns. The mobile phase, tetrahydrofuran, is eluted with a flow rate of 1 ml/min. The columns are thermostatted in an oven at 35° C. Detection is provided by a refractometer thermostatted at 35° C. The stationary phase of the columns is based on a poly(styrene/divinylbenzene) gel with controlled porosity.

Material Used:

liquid chromatography system, for example the Waters Alliance 2690 system equipped with an in-line degasser;
refractometer, for example the Waters 2410 refractometer;
software for acquiring and processing data, for example the Waters Millennium[32] software;
column oven, for example the Waters Columns Heater Module;
0.45 µm porosity filter for filtering tetrahydrofuran; and
chromatography columns:
2 columns are mounted in series:

| Number | Make | Molecular weight range (g/mol) | Length (mm) | Internal diameter (mm) | Particle size (µm) | Trade name | References (by way of indication) |
|---|---|---|---|---|---|---|---|
| Column 1 | WATERS | 2 000-10$^7$ | 300 | 7.8 | 10 | Styragel HT6E | WAT044219 |
| Column 2 | WATERS | 2 000-10$^7$ | 300 | 7.8 | 10 | Styragel HT6E | WAT044219 |

Figure 1:
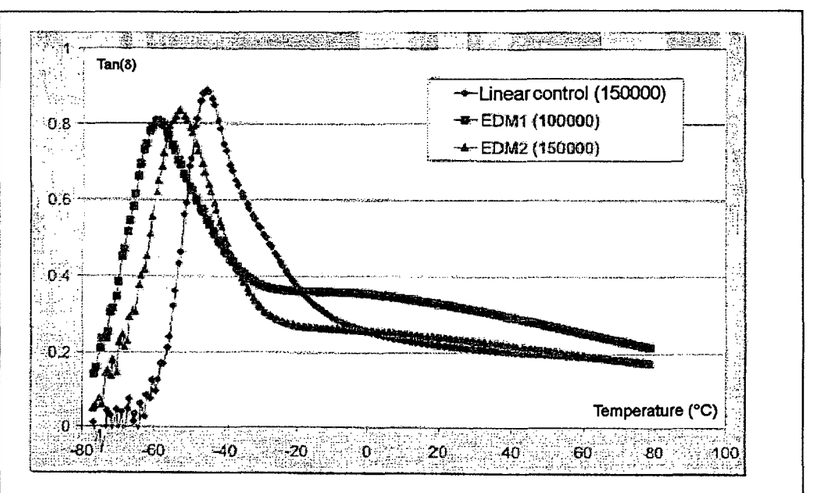
FIG. 1 is a graph illustrating the increase in hysteresis over a temperature range for compositions based on elastomers made in accordance with an embodiment of the invention.

FIG. 1: Change in tan δ as a function of temperature for the compositions B and C based on elastomers according to the invention.

II. Measurements and Tests Used

The elastomers according to the invention are characterized before curing as indicated below.

II-A—Determination of the Number-Average Molecular Weights $M_n$

Except where indicated otherwise, the number-average molecular weights are given by the equation $M_n$=charge of monomer by weight×conversion/theoretical number of moles of active alkali or alkaline-earth metal, knowing that the theoretical number of moles of active alkali or alkaline-earth metal is equal to the total number of moles of alkali or alka- II-C—Determination of the Inherent Viscosity at 25° C. of a 0.1 g/dl Polymer Solution in Toluene, from a Solution of Dry Polymer:

Principle:

The inherent viscosity is determined by measuring the flow time t of the polymer solution and the flow time $t_o$ of toluene, in a capillary tube.

In an Ubbelhode tube (diameter of the capillary 0.46 mm, capacity 18 to 22 ml), placed in a thermostatted bath at 25° C.±0.1° C., the flow time of toluene and that of the 0.1 g/dl polymer solution are measured.

The inherent viscosity is obtained by the following equation:

$$\eta_{inh} = \frac{1}{C} \ln\left[\frac{(t)}{(t_0)}\right]$$

with:

C: concentration of the polymer toluene solution in g/dl;
t: flow time of the polymer toluene solution in seconds;
$t_o$: flow time of toluene in seconds; and
$\eta_{inh}$: inherent viscosity expressed in dl/g.

II-D—Determination of the Microstructure of the Polymers by Carbon-13 NMR:

Sample Preparation:
solvent: $CDCl_3$ (3 ml);
weight of the sample: 200 mg (very strong influence on the quality of the spectrum, it is necessary to concentrate it as much as possible);
solubilization conditions: ambient temperature, 1 h-2 h (minimum); and
filtration: in case of the presence of particles in suspension.

Settings for the NMR Experiment:
Spectrometer: BRUKER AV250s Probe: DUAL $^{13}C/^1H$ 10 mm Pulse Sequence:
zgig
ns=8192
d1=6 s
SW=180 ppm
TD=16 k
acquisition time: 10 h 30 min II-E—Mooney Plasticity (Carried Out on the Elastomers) as Described Below.

II-F—Determination of the Glass Transition Temperature of the Polymers:

The glass transition temperatures $T_g$s of the polymers are measured by means of a differential scanning calorimeter.

The rubber compositions are characterized, before and after curing, as indicated below.

II-1. Mooney Plasticity

An oscillating consistometer such as described in the standard ASTM D 1646 is used. The Mooney plasticity measurement is carried out according to the following principle: the composition in the uncured state (i.e. before curing) is moulded in a cylindrical chamber heated to 100° C. After preheating for one minute, depending on the case, the rotor with a narrow width or the wide rotor turns within the specimen at 2 rpm and the working torque for maintaining this movement is measured after rotating for 4 minutes. The Mooney plasticity, respectively (ML 1+4) and (MS 1+4), is expressed as "Mooney units" (UM, with 1 UM=0.83 N·m).

II-2. Tensile Tests

These tests make it possible to determine the elasticity stresses and the properties at break. Except where indicated otherwise, they are carried out in accordance with the French standard NF T 46-002 of September 1988. At second elongation (i.e. after an accommodation cycle at the extension rate provided for the measurement itself) the nominal secant moduli (or apparent stresses, in MPa) are measured at 10% elongation (denoted by MA10), 100% elongation (denoted by MA100) and 300% elongation (denoted by MA300). The tensile strengths (in MPa) and elongations at break (in %) are also measured. All these tensile measurements are carried out under standard temperature (23±2° C.) and moisture (50±5% relative humidity) conditions, according to the French standard NF T 40-101 (December 1979).

II-3. Shore Hardness A

The Shore hardness A of the compositions after curing is assessed in accordance with the standard ASTM D 2240-86.

II-4. Dynamic Properties

The dynamic properties $\Delta G^*_{max}$ and tan $\delta_{max}$ are measured on a viscoanalyser (Metravib VA4000), according to the standard ASTM D 5992-96. The response of a sample of vulcanized composition (cylindrical test piece 4 mm in thickness and 400 $mm^2$ in cross section), subjected to a sinusoidal stress in simple alternating shear at a frequency of 10 Hz, under standard temperature conditions (23° C.) according to the standard ASTM D 1349-99 is recorded. A scan with a strain amplitude ranging from 0.1 to 50% (forward cycle) then from 50% to 1% (return cycle) is carried out. The results gathered are the complex dynamic shear modulus ($G^*$), the complex dynamic shear modulus G" expressed by the maximum G" measurement, denoted by $G"_{max}$ 23° C. at an amplitude ranging from 0.1 to 50% and at a strain amplitude of 50% and the loss factor tan δ. For the return cycle, the maximum value of tan δ observed, denoted by tan $\delta_{max}$ and also the difference in complex modulus ($\Delta G^*$) between the values at 0.15 and 50% strain (the Payne effect) are indicated.

II-5. Measurement of the Hysteresis Properties

The hysteresis properties may be evaluated by measurement of the energy losses by rebound of the samples at a set energy measured at the 6th impact, under standard temperature conditions (23° C.) or at higher temperatures (60° C.), expressed in % according to the following equation:

PH (%)=100[$(W_0-W_1)/W_0$] with $W_0$: energy supplied;
$W_1$: energy restored.

III. Exemplary Embodiments of the Invention

III-1. Elastomer Preparation

A—Synthesis of an elastomer comprising on average 2×5 polybutadiene grafts having an $M_n$ of 10 000 (BR) and a BR core of $M_n$ 2×50 000.

Synthesis of a living polybutadiene with $M_n$ of 10 000

A 10 liter reactor was charged with 5500 ml of nitrogen-sparged methylcyclohexane and 870 ml of butadiene. The medium was brought to 60° C., the impurities were neutralized with 350 μmol of BuLi, and 40 ml of 1.415 mol/l sBuLi were introduced. After polymerizing for 40 minutes at 60° C., the temperature of the reaction medium was lowered to −5° C.

Synthesis of the polybutadiene macromonomer with $M_n$ of 10 000

At −5° C., 8.7 ml of chloromethylstirenc chloromethylstyrene (VBC) were introduced. After a contact time of 17 h at −5° C., the temperature was again raised to 60° C.

Polymerization of the macromonomer, followed by that of the butadiene and coupling reaction with dimethyldichlorosilane 13.1 ml of 1.415 mol/l sBuLi (of which 39% was to neutralize the excess of VBC), then 9.6 ml of a 100 g/l tetrahydrofurfuryl ethyl ether solution, were introduced. After polymerizing the macromonomer for 30 minutes at 60° C., 870 ml of butadiene were added. After polymerizing for 15 minutes at 60° C., 9.7 ml of 0.536 mol/l dimethyldichlorosilane were introduced. After a contact time of 30 minutes at 60° C., 1.4 ml of methanol diluted in 150 ml of sparged toluene were added to the reaction medium.

Finally, 0.5 phr of 2,2'-methylenebis(4-methyl-6-tert-butylphenol) were added to the polymer still in solution. The polymer was recovered dry after drying in an oven under reduced pressure at 60° C. under nitrogen.

Characterization of the elastomer thus prepared:
$T_g$ (ΔT): −76° C. (16)
Vinyl: 34.7% (61% of which in the main chain)
Trans: 37%
Cis: 29%
Inherent viscosity at 0.1 g/dl in toluene at 25° C.: 1.38
Inherent viscosity at 0.1 g/dl:
 of the polybutadiene before reaction with VBC and terminated with methanol: 0.26*
 of the macromonomer: 0.29*
 of the polymacromonomer terminated with methanol: 0.49*
 of the macromonomer/butadiene block polymer: 0.78
SEC analysis
 $M_n$: 89 136
 $M_w$: 155 885
 PI: 1.75.
* measured at 0.2 g/dl.

B—Synthesis of an elastomer comprising on average 2×5 SBR grafts of $M_n$ 10 000 and an SBR core of $M_n$ 2×75 000:

Prior preparation of the $AlLiR_4$ solution:
Introduced into 55.62 ml of sparged methylcyclohexane were 7.43 ml of 0.9425 mol/l nBuLi and 8.2 ml of 0.8747 mol/l trioctylaluminium.

Synthesis of a living SBR with $M_n$ of 10 000
A 10 liter reactor was charged with 5455 ml of nitrogen-sparged methylcyclohexane, 398.5 ml of butadiene, 100.0 ml of styrene and 0.605 ml of ethyl tetrahydrofurfuryl ether (ETE) diluted in the styrene charge. The medium was brought to 40° C., the impurities were neutralized with 400 μmol of sBuLi and 25.4 ml of 1.38 mol/l sBuLi were introduced. After polymerizing for 55 minutes at 40° C., the temperature of the reaction medium was cooled. That is to say, 5 minutes later the temperature was 29° C.

Synthesis of the SBR macromonomer with $M_n$ of 10 000
Next, 45.7 ml of the LiAlR4 solution (namely 1.025 molar equivalents of ETE) previously prepared were injected at 29° C. The temperature was then lowered to −12° C. in the space of around twenty minutes, and 5.5 ml of chloromethylstyrene (VBC, namely 1.1 molar equivalents of active lithium) were introduced. After one night at −7° C., the temperature was raised to 60° C.—

Polymerization of the macromonomer, followed by that of the butadiene and styrene, then coupling the reaction with dimethyldichlorosilane
8.62 ml of 1.38 mol/l sBuLi (of which 41% was to neutralize the excess of VBC) were introduced at 60° C., and also a solution of ETE in methylcyclohexane (8.37 ml at 0.835 mol/l). After polymerizing the macromonomer for 30 minutes at 60° C., 525 g of a charge having 74% of butadiene and 26% of styrene was injected. The polymerization was carried out at a temperature kept between 58 and 63° C. 22 minutes later, 6.8 ml of a 0.413 mol/l solution of dimethyldichlorosilane in methylcyclohexane was introduced into the reaction medium. After a contact time of 30 minutes at 60° C., 0.82 ml of methanol diluted in 150 ml of sparged toluene was added to the reaction medium.

Finally, 0.4 phr of 2,2'-methylenebis(4-methyl-6-tert-butylphenol) was added to the polymer still in solution. The polymer was recovered thy after drying in an oven under reduced pressure at 60° C. under nitrogen.

Characterization:

| of the elastomer thus prepared: | of the graft: |
| --- | --- |
| Styrene: 25.4% | styrene: 23.9% |
| Vinyl: 58.0% | vinyl: 59.4% |
| Trans: 21.7% | trans: 21.7% |
| Cis: 20.4% | cis: 20.4% |

Inherent viscosity at 0.1 g/d1 in toluene at 25° C.: 1.87
SEC analysis $M_n$: 96 529
$M_w$: 240 827 and
PI: 2.50

C—Synthesis of an elastomer comprising on average 2×5 BR grafts having an $M_n$ of 10 000 and an SBR core of $M_n$ 2×75 000.

Synthesis of a living BR with $M_n$ of 10 000
A 10 liter reactor was charged with 5500 ml of nitrogen-sparged methylcyclohexane and 543 ml of butadiene. The medium was brought to 60° C., the impurities were neutralized with 600 μmol of nBuLi, and 25.6 ml of 1.38 mol/l sBuLi were introduced. After polymerizing for 50 minutes at 60° C., the temperature of the reaction medium was lowered to −5° C.

Synthesis of the BR macromonomer with $M_n$ of 10 000
A −5° C., 5.5 ml of chloromethylstyrene (VBC, namely 1.1 molar equivalents of active lithium) were introduced. After being in contact for one night at −5° C., the temperature was again raised to 60° C.

Polymerization of the macromonomer, followed by that of the butadiene and styrene, then coupling the reaction with dimethyldichlorosilane
8.11 ml of 1.38 mol/l sBuLi (of which 37% was to neutralize the excess of VBC) were introduced at 60° C., and also a solution of ETE in methylcyclohexane (8.8 ml at 0.804 mol/l). After polymerizing the macromonomer for 30 minutes at 60° C., 529 g of a charge having 74% of butadiene and 26% of styrene was injected. The polymerization was carried out at a temperature kept between 56 and 63° C. 22 minutes later, 6.7 ml of a 0.422 mol/l solution of dimethyldichlorosilane in methylcyclohexane was introduced into the reaction medium. After a contact time of 30 minutes at 60° C., 0.82 ml of methanol diluted in 150 ml of sparged toluene was added to the reaction medium.

Finally, 0.4 phr of 2,2'-methylenebis(4-methyl-6-tert-butylphenol) was added to the polymer still in solution. The polymer was recovered dry after drying in an oven under reduced pressure at 60° C. under nitrogen.

Characterization:

| of the elastomer thus prepared: | of the graft: |
| --- | --- |
| Styrene: 14.9% | |
| Vinyl: 33.7% | vinyl: 7.1% |
| Trans: 34.9% | trans: 49.8% |
| Cis: 31.8% | cis: 43.1% |

Inherent viscosity at 0.1 g/dl in toluene at 25° C.: 1.97
SEC analysis $M_n$: 123 616
$M_w$: 263 626 and
PI: 2.13

D—Synthesis of an EB1 block elastomer comprising on average 2×5 BR grafts having an $M_n$ of 10 000 and a BR core of $M_n$ 2×50 000.

Synthesis of a living polybutadiene with $M_n$ of 10 000
A reactor was charged with 49 687 ml of nitrogen-sparged methylcyclohexane and 8184 ml of butadiene. The medium was brought to 60° C., the impurities were neutralized with 4.54 mmol of BuLi, and 2111 ml of 0.252 mol/l sBuLi were introduced. After polymerizing for 50 minutes at 60° C., the temperature of the reaction medium was lowered to −5° C.

Synthesis of the polybutadiene macromonomer with $M_n$ of 10 000

At −5° C., 160 ml of 3.5 mol/l chloromethylstyrene (VBC) were introduced. After being in contact for one night at −5° C., the temperature was again raised to 60° C.

Polymerization of the macromonomer, followed by that of the butadiene and coupling reaction with dimethyldichlorosilane 597 ml of 0.252 mol/l sBuLi (of which 29% was to neutralize the excess of VBC), then 582 ml of a 0.134 mol/l tetrahydrofurfuryl ethyl ether solution, were introduced. After polymerizing the macromonomer for 30 minutes at 60° C., 8184 ml of butadiene were added. After polymerizing for 14 minutes at a temperature increasing up to 76° C., 1404 ml of 0.035 mol/l dimethyldichlorosilane were introduced. After a contact time of 30 minutes at 60° C., 641 ml of 0.5 mol/l methanol in sparged toluene were added to the reaction medium.

Finally, added to the polymer still in solution were:
0.8 phr of 2,2'-methylenebis(4-methyl-6-tert-butylphenol); and
0.2 phr of N-1,3-dimethylbutyl-N-phenylparaphenylenediamine.

The polymer was recovered dry after stripping and drying on a Welding (single-screw extruder equipped with a die having 1 hole of 3 mm and 6 holes of 6 mm).

Characterization of the elastomer thus prepared:
$T_g$ (ΔT): −80° C.
Vinyl: 31.0%, Trans: 39.7%, Cis: 29.3%
Inherent viscosity at 0.1 g/dl in toluene at 25° C.: 1.55
SEC analysis: $M_n$ 114 106; $M_w$ 205 235; PI 1.80
(ML 1+4): 47
Characterization of the graft: Vinyl: 8.2%, Trans: 54.9%, Cis: 36.9%

E—Synthesis of an EB2 block elastomer comprising on average 2×5 BR grafts having an $M_n$ of 10 000 and a BR core of $M_n$ 2×75 000.

Synthesis of a living polybutadiene with $M_n$ of 10 000

A reactor was charged with 53 172 ml of nitrogen-sparged methylcyclohexane and 5391 ml of butadiene. The medium was brought to 60° C., the impurities were neutralized with 4.45 mmol of BuLi, and 1419 ml of 0.247 mol/l sBuLi were introduced. After polymerizing for 60 minutes at 60° C., the temperature of the reaction medium was lowered to −5° C.

Synthesis of the polybutadiene macromonomer with $M_n$ of 10 000

At −5° C., 105 ml of 3.5 mol/l chloromethylstyrene (VBC) were introduced. After being in contact for one night at −5° C., the temperature was again raised to 60° C.

Polymerization of the macromonomer, followed by that of the butadiene and coupling reaction with dimethyldichlorosilane 424 ml of 0.247 mol/l sBuLi (of which 33% was to neutralize the excess of VBC), then 586 ml of a 0.134 mol/l tetrahydrofurfuryl ethyl ether solution, were introduced. After polymerizing the macromonomer for 30 minutes at 60° C., 8086 ml of butadiene were added according to the following protocol: 1300 ml were first injected in a single go, then the remainder was introduced around 4 minutes later at a rate of 250 g/min. After polymerizing for 15 minutes at a temperature increasing from 40 to 76° C., 882 ml of 0.035 mol/l dimethyldichlorosilane were introduced. After a contact time of 30 minutes at 60° C., 421 ml of 0.5 mol/l methanol in sparged toluene were added to the reaction medium.

Finally, added to the polymer still in solution were:
0.8 phr of 2,2'-methylenebis(4-methyl-6-tert-butylphenol); and
0.2 phr of N-1,3-dimethylbutyl-N-phenylparaphenylenediamine.

The polymer was recovered dry after stripping and drying on a Welding (single-screw extruder equipped with a die having 1 hole of 3 mm and 6 holes of 6 mm).

Characterization of the elastomer thus prepared:
$T_g$ (ΔT): −74° C.
Vinyl: 36.0%, Trans: 36.6%, Cis: 27.4%
Inherent viscosity at 0.1 g/dl in toluene at 25° C.: 2.15
SEC analysis: $M_n$ 120 673; $M_w$ 258 258; PI 2.14
(ML 1+4): 85
Characterization of the graft: Vinyl: 7.8%, Trans: 54.9%, Cis: 37.3%

EB2 is the result of 3 syntheses:
$T_g$ (ΔT): −74° C.
Vinyl: 35.7%, Trans: 36.2%, Cis: 28.1%
Inherent viscosity at 0.1 g/dl in toluene at 25° C.: 2.15
(ML 1+4): 91
SEC analysis: $M_n$ 125 160; $M_w$ 256 558; PI 2.05

Synthesis of an unbranched linear control elastomer (linear triblock BR):

A reactor was charged with 41 826 ml of nitrogen-sparged methylcyclohexane and 1335 ml of butadiene. The medium was brought to 60° C., the impurities were neutralized with 2.72 mmol of BuLi and 351 ml of 0.247 mol/l sBuLi were introduced. After polymerizing for 70 minutes at 60° C. (100% conversion) the following were successively introduced:

458 ml of a 0.134 mol/l tetrahydrofurfuryl ethyl ether solution; 10 018 ml of butadiene according to the following protocol: 1300 ml were first injected in a single go, then the remainder was introduced around 4 minutes later at a rate of 250 g/min. After polymerizing for 23 minutes at a temperature increasing up to 75° C., 1091 ml of 0.035 mol/l dimethyldichlorosilane were introduced. After a contact time of 30 minutes at 60° C., 521 ml of 0.5 mol/l methanol in sparged toluene were added to the reaction medium.

Finally, added to the polymer still in solution were:
0.8 phr of 2,2'-methylenebis(4-methyl-6-tert-butylphenol); and
0.2 phr of N-1,3-dimethylbutyl-N-phenylparaphenylenediamine.

The polymer was recovered dry after stripping and drying in an oven at 50° C. under reduced pressure under nitrogen.

Characterization of the elastomer thus prepared:
$T_g$ (ΔT): −61° C.
Vinyl: 49.3%, Trans: 28.4%, Cis: 22.3%
Inherent viscosity at 0.1 g/dl in toluene at 25° C.: 1.65
SEC analysis: $M_n$ 122 728; $M_w$ 137 716; PI 1.12
Characterization of the 1st BR block: Vinyl: 7.5%, Trans: 53.7%, Cis: 38.8%,
$M_n$ 11 543; $M_w$ 12 193; PI 1.06
The "linear triblock BR" is the result of 4 syntheses:
$T_g$ (ΔT): −61° C. (8)
Vinyl: 49.3%, Trans: 28.4%, Cis: 22.3%
Inherent viscosity at 0.1 g/dl in toluene at 25° C.: 1.65
SEC analysis: $M_n$ 128 936; $M_y$, 150 025; IP 1.16
The physicochemical characteristics of these elastomers are summarized in Table 1 below.

TABLE 1

|  | Linear triblock BR | EB1 | EB2 |
|---|---|---|---|
| Inherent viscosity (dl/g) | 1.65 | 1.55 | 2.15 |
| Mooney (ML1 + 4) 100° C. | — | 47 | 91 |
| Fluidity (150 kg) | — | 349 | 146 |
| $M_n$ of the core | 150 000 | 100 000 | 150 000 |
| Number of grafts | 2 × 1 | 2 × 5 | 2 × 5 |
| $M_n$ of the grafts | 10 000 | 10 000 | 10 000 |
| Overall microstructure | | | |
| %1, 2 | 49.3 | 31 | 35.7 |
| % trans | 28.4 | 39.7 | 36.2 |
| % cis | 22.3 | 29.3 | 28.1 |
| Microstructure of the grafts | | | |
| %1, 2 | 7.5 | 8.2 | 7.8 |
| % trans | 52.9 | 54.9 | 54.9 |
| % cis | 39.6 | 36.9 | 37.3 |
| Microstructure of the core | | | |
| %1, 2 | 54.8 | 53.8 | 54.3 |
| % trans | 25.1 | 24.5 | 23.7 |
| % cis | 20 | 21.7 | 22 |
| $T_g$ (° C.) | −61.4 | −79.9 | −74 |
| dT (° C.) | 8 | 14 | 15 |
| Density | 0.895 | 0.911 | 0.897 |
| PI | 1.16 | 1.80 | 2.05 |

A person skilled in the art will understand that modified synthesis conditions would make it possible to obtain other elastomers according to the invention.

III-2. Preparation of the Rubber Compositions

Two batches of branched block elastomers prepared in batch mode according to the invention as described above in paragraphs III-1-D and E, one having a number-average molecular weight $M_n$=100 000 g/mol (EB1), the other having a number-average molecular weight $M_n$=150 000 g/mol (EB2) for the core and a control elastomer (linear triblock BR) having a molecular weight of 150 000 g/mol for the core and having a single graft per end whereas the elastomers EB1 and EB2 have, on average, 5 grafts of molecular weight 10 000 g/mol at each end, were tested in vulcanizable rubber compositions.

For the following tests, the elastomers were tested in a base composition reinforced with carbon black described below (contents of the various products expressed in phr).

| Elastomer | 100 |
|---|---|
| Carbon black N234 | 50 |
| ZnO | 3 |
| Stearic acid | 2 |
| Antioxidant* | 1 |
| Sulphur Sol 2H | 1.2 |
| Accelerator** | 1.2 |

*N-1,3-dimethylbutyl-N-phenylparaphenylenediamine (Santoflex 6-PPD from Flexsys);
**N-cyclohexyl-2-benzothiazyl-sulphenamide (Santocure CBS from Flexsys).

The mixtures were produced with the following mixing conditions:
0 minute: elastomer+black+ZnO+stearic acid
5 minutes: drop Each composition was produced by thermomechanical work in a step which lasted around 5 minutes for an average speed of the blades of 85 rpm in a mixer of around 400 cm³ until reaching a maximum dropping temperature identical to 160° C., whereas the step of incorporating the vulcanization system was carried out on an open mill at 30° C. for 3 to 4 minutes.

The compositions thus obtained were then calendered in the form of sheets (thickness of 2 to 3 mm) or of thin sheets of rubber for the measurement of their physical or mechanical properties, or extruded to form profiles that can be used directly, after cutting and/or assembling to the desired dimensions, for example as semi-finished products for tires, in particular as tire treads.

III-3. Evaluation of the Compositions Based on Carbon Black

The properties of the compositions as prepared above are given in Table 2 below.

TABLE 2

| | Composition | | |
|---|---|---|---|
| | A | B | C |
| Gum | Linear triblock BR (Control) | EB1 | EB2 |
| Mooney (MS1 + 4) 100° C. | 43.6 | 49.6 | 90.2 |
| Shore A hardness 23° C. | 66.97 | 55.07 | 64.13 |
| MAS 10 (Mpa) | 5.974 | 3.172 | 5.357 |
| MAS 100 (Mpa) | 2.078 | 1.272 | 2.336 |
| MAS 300 (Mpa) | 2.453 | 1.678 | break |
| MAS 300/MAS 100 | 1.18 | 1.31 | break |
| Losses at 23° C. (%) | 37.59 | 44.32 | 42.32 |
| Strain (%) | 33.08 | 47.94 | 34.93 |
| Losses at 60° C. | 33.42 | 32 | 32.07 |
| Strain (%) | 37.89 | 56.21 | 42.37 |
| G* 0.1% (MPa) 23° C. | 4.94 | 2.91 | 3.67 |
| G* 50% (MPa) | 1.78 | 1.06 | 1.63 |
| ΔG 23° C. (MPa) | 3.17 | 1.85 | 2.04 |
| G″ max (MPa) 23° C. | 0.698 | 0.622 | 0.645 |
| G″ 50% (MPa) | 0.288 | 0.301 | 0.369 |
| Tan$\delta_{max}$ 23° C. | 0.214 | 0.323 | 0.252 |

Thus, it surprisingly appears that the compositions B and C based respectively on elastomers EB1 and EB2, according to the invention, have hysteresis properties at 23° C. (rebound losses and tan $\delta_{max}$) significantly greater than those of the composition A based on a control triblock butadiene elastomer (BR).

These differences in hysteresis properties make it possible to ensure that compositions B and C have significantly improved damping properties in a temperature range close to the $T_g$ relative to the control composition A.

At high temperature (60° C.), the hysteresis properties (rebound losses) of the compositions B and C are then equivalent to those of the control composition A.

The change in Tan δ as a function of the temperature given in FIG. 1 makes it possible to illustrate the increase in hysteresis over a temperature range between 0° C. and 60° C. for the compositions B and C based on elastomers according to the invention.

In summary, due to the incorporation into the rubber compositions of an elastomer according to the invention, it is possible to obtain a significant increase in hysteresis over a certain temperature range relative to standard black blends.

The invention finds particularly advantageous applications in rubber compositions that can be used for manufacturing finished articles or semi-finished products incorporated in the composition of tire casings, such as for example underlayers, sidewalls and treads and in obtaining tires that have improved grip or comfort.

The invention claimed is:

1. A block elastomer comprising at least two main linear diene polymer chains joined together by a group having a heteroatom chosen from the group composed of Si, Sn, Ge, Pb, and P, derived from a coupling agent, or by a radical derived from a difunctional, non-polymerizable, electrophilic coupling agent, and having at each of their other ends a polymacromonomer block that is formed of a plurality of grafts made of macromoner units, wherein each of the grafts is a linear diene polymer chain, and wherein the block elastomer has a diblock pattern.

2. The block elastomer according to claim 1, wherein the block elastomer comprises from 2 to 6 main linear diene polymer chains.

3. The block elastomer according to claim 1, wherein the block elastomer comprises two main linear diene polymer chains.

4. A block elastomer comprising a main linear diene polymer chain and a polymacromonomer block that is formed of a plurality of grafts made of macromoner units at one of the two ends of said main linear diene polymer chain, each of the grafts being a linear diene polymer chain, the other end bearing:
an electrophilic-type function (Z); or
a proton, wherein the block elastomer has a diblock pattern.

5. The block elastomer according to claim 1, wherein the polymacromonomer block at one of the ends of each main diene polymer chain comprises, on average, from 2 to 25 grafts.

6. The block elastomer according to claim 4, wherein the polymacromonomer block at the end of the main diene polymer chain, comprises, on average, from 2 to 25 grafts.

7. The block elastomer according to claim 1, wherein the diene polymers present in the main polymer chain or in the grafts are chosen from polybutadienes (BRs), synthetic polyisoprenes (IRs), butadiene copolymers, and isoprene copolymers.

8. The block elastomer according to claim 1, wherein the length of each of the main polymer chains is greater than the length of each of the grafts.

9. The block elastomer according to claim 1, wherein the length of each graft is from 1000 to 4 times, smaller than that of each main polymer chain.

10. The block elastomer according to claim 1, wherein each polymeric part of each main polymer chain has a number-average molecular weight between 2000 and 500 000.

11. The block elastomer according to claim 1, wherein the length of each of the grafts has a number-average molecular weight between 500 and 70 000.

12. A process for preparing a block elastomer, comprising the steps of:
(1) synthesis of a macromonomer by reaction of at least one living diene polymer having a carbanion with a stoichiometric excess of a compound having a group polymerizable by an anionic route and a group capable of nucleophilic displacement via the carbanion of said living polymer;
(2) reaction of the macromonomer solution formed in step (1) with a nucleophilic initiator, to obtain a living polymacromonomer;
(3) reaction of the living polymacromonomer obtained in step (2) with at least one conjugated diene monomer having from 4 to 12 carbon atoms, in order to obtain a living polymacromonomer/diene polymer diblock; and
(4) reaction of the living diblock obtained in step (3) with an at least difunctional, non-polymerizable, electrophilic coupling agent, with an electrophilic reactant that is a precursor of functional groups or with an acidic proton donor compound.

13. The process according to claim 12, wherein the living diene polymer is chosen from polybutadienes (BRs), synthetic polyisoprenes (IRs), butadiene copolymers, isoprene copolymers, butadiene/styrene copolymers (SBRs), isoprene/butadiene copolymers (BIRs), isoprene/styrene copolymers (SIRs), isoprene/butadiene/styrene copolymers (SBIRs) and blends of such (co)polymers.

14. The process according to claim 12, wherein the compound having both a group polymerizable by an anionic route and a group capable of nucleophilic displacement via the carbanion of said living polymer is a compound having a styryl function on the one hand and a halogen atom that is reactive with respect to nucleophiles.

15. The process according to claim 14, wherein the compound having both a group polymerizable by an anionic route and a group capable of nucleophilic displacement via the carbanion of said living polymer is chosen from chloromethylstyrene (VBC), chlorodimethylsilylstyrene, chlorodimethylsilylmethylstyrene and bromomethylstyrene.

16. The process according to claim 12, wherein the compound having both a group polymerizable by an anionic route and a group capable of nucleophilic displacement via the carbanion of said living polymer is used in stoichiometric excess with respect to the theoretical amount of alkali or alkaline-earth metal in a ratio strictly greater than 1.0 and less than 2 molar equivalents, and preferably from 1.05 to 1.5 molar equivalents.

17. The process according to claim 12, wherein the reaction temperature of step (1) is between −20° C. and 70° C.

18. The process according to claim 12, wherein the nucleophilic initiator used in step (2) is chosen from sec-butyllithium, n-butyllithium, t-butyllithium, sodium naphthalene, 1,4-disodio-1,1,4,4-tetraphenylbutane, diphenyl-methylpotassium, diphenylmethylsodium, 1'-methylstyryllithium and 1,1-diphenyl-3-methylpentyllithium or the initiators having an optionally protected amine, imine, tin or alcohol functional group.

19. The process according to claim 12, wherein the conjugated dienes used in step (3) are chosen from 1,3-butadiene, 2-methyl-1,3-butadiene, 2,3-di($C_1$ to $C_5$ alkyl)-1,3-butadienes, 2-methyl-3-ethyl-1,3-butadiene, 2-methyl-3-isopropyl-1,3-butadiene, an aryl-1,3-butadiene, 1,3-pentadiene, and 2,4-hexadiene.

20. The process according to claim 12, wherein the at least difunctional, non-polymerizable, electrophilic coupling agent is chosen from the group composed of compounds of organometallic type corresponding to the following formulae (IV): $Y(X)_n(R_1)_{4-n}$, or (V): $(R_1)_{3-m}X_mY—R'—YX_n(R_1)_{3-n'}$ n which n is an integer 2, 3 or 4 or n' is an integer 1, 2 or 3, Y is Si, Ge, Sn, or Pb, X is a halogen atom, or an alkoxyl or aryloxy group, $R_1$, being identical or different, is a $C_1$-$C_{12}$ hydrocarbon-based radical, or a $C_6$-$C_{18}$ aryl radical, R' being a linear or cyclic $C_1$-$C_{12}$ unsaturated hydrocarbon-based radical, or a $C_6$-$C_{18}$ arylene radical; and tin derivatives corresponding to the following general formula (VI): $(R_1)_{4-n}Sn(X)_n$ in which $R_1$, X and n have the meaning indicated above; esters; orthoesters; multiesters; and diisocyanates.

21. The process according to claim 20, wherein the at least difunctional, non-polymerizable, electrophilic coupling agent is chosen from the compounds of formula (IV): $Si(X)_n(R_1)_{4-n}$ in which X is a halogen atom, $R_1$, being identical or different, is a $C_1$-$C_{12}$ hydrocarbon-based radical, n is an integer 2, 3 or 4.

22. The process according to claim 12, wherein the electrophilic reactant that is a precursor of functional groups is chosen from the functionalizing agents that are precursors of carboxylic acid, alcohol, silanol, alkoxysilane, organostannyl and amine functional groups and in that the acidic proton donor compound is methanol.

23. The process according to claim 12, wherein the amount of the at least difunctional, non-polymerizable, electrophilic coupling agent is between 0.1 and 0.5 molar equivalent relative to the compound obtained in step (3).

24. The process according to claim 12, wherein the amount of the proton donor compound or of the functionalizing agent is between 1 and 10 molar equivalents.

25. The process according to claim 12, wherein the process additionally comprises a step (5) that brings the polymer obtained at the end of step (4) into contact with an antioxidant.

26. A rubber composition, that can be used for manufacturing tires, based on at least: a block elastomer defined according to claim 3, and a reinforcing filler.

27. The composition according to claim 26, wherein the reinforcing filler is present in an amount between 20 and 200 phr (parts by weight per hundred of elastomer).

28. The composition according to claim 26, wherein the reinforcing filler is mainly an inorganic filler.

29. The composition according claim 26, wherein the reinforcing filler is mainly an organic filler.

30. The composition according to claim 26, further comprising a vulcanization system.

31. The composition according to claim 30, wherein the composition is in the vulcanized state.

32. A method for manufacturing a finished article or a semi-finished product intended for a ground-contact system of a motor vehicle with the composition according to claim 26.

33. The method according to claim 32, wherein the finished article is a tire.

34. The method according to claim 33, wherein the semi-finished products for tires are chosen from the group composed of treads, underlayers, crown reinforcement plies, sidewalls, casing reinforcement plies, beads and protectors.

35. A finished article or semi-finished product for a ground-contact system of a motor vehicle, comprising a composition according to claim 26.

36. The finished article according to claim 35, consisting of a tire.

37. The semi-finished product according to claim 35, consisting of a semi-finished product for a tire.

38. The semi-finished product according to claim 37, chosen from the group composed of treads, underlayers for these treads, crown plies, sidewalls, casing plies, beads and protectors.

39. The block elastomer according to claim 8, wherein the length of each graft is from 100 to 10 times smaller than that of the main chain.

40. The block elastomer according to claim 1, wherein the length of each graft has a number-average molecular weight between 5,000 and 25,000.

* * * * *